United States Patent Office 3,487,037
Patented Dec. 30, 1969

3,487,037
PROCESS FOR THE PRODUCTION OF GRAFT COPOLYMERS OF DIENES ON VINYL-TYPE POLYMERS
Jean-Marie Michel, Champigny-sur-Marne, and Jean Peyrade, La Courneuve, France, assignors to Pechiney-Compagnie de Produits Chimiques et Electrometallurgiques, Paris, France
No Drawing. Continuation-in-part of application Ser. No. 144,833, Oct. 13, 1961. This application July 1, 1963, Ser. No. 292,087
Claims priority, application France, July 6, 1962, 903,185
Int. Cl. C08f *1/62, 1/58*
U.S. Cl. 260—29.7
4 Claims

ABSTRACT OF THE DISCLOSURE

A process for the graft polymerization of diene monomers, to which copolymerizable ethylenic monomers may be added, onto a vinyl polymer or copolymer, which consists of adding only a water soluble complexing compound in the form of a chelating agent, e.g. an alkali metal pyrophosphate, to the preformed vinyl polymer latex on or before the addition of the monomer.

---

This application is a continuation-in-part of our copending application Ser. No. 144,833, filed Oct. 13, 1961, now abandoned.

A graft copolymer is obtained from the covalent bonding to an existing polymer known as a "trunk" or "backbone," of polymeric side chains of different chemical structure known as "grafts." The trunk chain may be a homopolymer or a copolymer; the graft chains may all be identical or not and are obtained by grafting one or more monomers. The physical and mechanical properties of the graft copolymers are different from those of the statistical copolymers and also different from those of a mixture of the homopolymers.

Many methods of graft copolymerization are known, for example:

(1) By direct irradiation by means of ionizing rays which create active centers on the chain of the trunk polymer;

(2) By radiochemical peroxidation of the trunk polymer;

(3) By chemical peroxidation, for example "ozonization," of the trunk polymer;

(4) By transfer by means of a conventional polymerization initiator of the peroxide type suitable for initiating the polymerization of the monomers to be grafted.

The methods employing ionizing radiations require the utilization of expensive radiation-producing equipment as well as effective means of protection against radiation hazards.

The peroxidation processes always result in a degradation of the trunk polymer. Furthermore, after grafting, peroxides remain as substituents in the chain, which results in a considerable reduction in the stability of the graft copolymers so obtained.

The transfer process is much simpler owing to the fact that it can be carried out in a conventional apparatus. For example, the trunk homopolymer or copolymer is prepared in an autoclave in the form of latex and the second monomer is then introduced. In certain cases, the polymerization initiator system utilized for the preparation of the trunk polymer may be capable of ensuring the grafting and the growth of the side chains. This is the case, for example, with the grafting of vinyl acetate onto polyvinyl chloride which is dispersed in a freshly prepared latex, with the aid of the initiator system potassium persulphate/sodium metabisulphite. Sixty percent of the vinyl acetate is grafted onto the polyvinyl chloride and 40% is converted into homopolymers which are easy to separate.

This transfer method, which is extremely simple, unfortunately cannot be generally applied to the graft polymerization of diene monomers or mixtures of diene monomers and ethylenic monomers because the polymerization initiators employed for the preparation of the trunk polymer latex are usually ineffective for initiating the grafting and the polymerization of diene hydrocarbons. Potassium persulphate or the redox system persulphate/metabisulphite, for example, are ineffective by themselves in the absence of special conditions, or additives.

To accomplish the graft copolymerization of dienes by a transfer mechanism, several modifications have been suggested. For example, it has been proposed to treat an aqueous emulsion of the trunk polymer by potassium persulphate and to heat said mixture until there is complete destruction of the persalt so that active centers are created on the trunk polymer; after which the monomer is added in the form of an aqueous dispersion in the emulsion of the said trunk polymer, resulting in a graft polymerization. It is obvious, however, that this severe treatment of the trunk polymer leads to an ultimate rupture of the trunk polymer chains, thereby weakening the resultant graft copolymer.

It is also possible to add a second polymerization initiator suitable for the polymerization of diene hydrocarbons, but the constituents of these initiators are incorporated in the final polymer and are detrimental to its stability.

It is, moreover, possible to add to the reaction mixture, instead of a second initiator system, a mercaptan which enables the polymerization of the dienes to be initiated in the presence of an initiator of the persulphate type, but the presence of the mercaptan interferes considerably with the grafting reaction and reduces the effectiveness thereof. Specifically, mercaptide-type agents are detrimental because they reduce grafting ratio, i.e., the quantity of monomers effectively grafted (cf. W. V. Burlant and A. S. Hoffman in "Block and Graft Copolymers"—Reinhold pub. Cy. 1960, p. 18).

The principal object of the present invention, therefore, is to provide a new process which, without any addition detrimental to the final polymer, makes it possible to ensure the emulsion graft copolymerization of diene monomers, alone or mixed with ethylenic monomers, onto a trunk polymer dispersed in a latex and prepared from one or more vinyl monomers in the presence of an initiator system conventionally employed for this emulsion addition—polymerization of vinyl monomers. These initiator systems of this invention comprise, in particular, water-soluble inorganic peroxide salts, such as potassium persulphate alone or mixed with sodium metabisulphite.

Another object of this invention is to provide such a graft copolymerization process which results in unexpectedly high rates of reaction.

Other objects and advantages of this invention will become apparent upon further study of the specification and appended claims.

These objects are attained by the surprising discovery that a complexing agent, such as chelating or sequestering agents, for heavy metal ions, e.g. $Fe^{++}$, $Fe^{+++}$, $Cu^{++}$, $Ni^{++}$, when added to a latex of a vinyl-type polymer admixed with diene monomers, gives the same results as chain transfer agents, and as polymerization initiators, thereby resulting in the attachment of diene polymer branches to a trunk of a vinyl-type polymer. Furthermore, it has been unexpectedly discovered that there is a cooperative relationship between the freshly prepared latex and the complexing agents. The rate of a graft copolymerization of a diene monomer in the latex in contact with the complexing agent is much faster than the simple polymerization of the diene monomer out of contact with the vinyl polymer latex, but in contact with the complexing agent.

The complexing agent may be added to the reactor, either before or after the preparation of the trunk polymer latex. It is then sufficient to add to the latex, the diene monomer or mixture of diene and ethylenic monomers to be grafted; and thereafter to maintain a temperature suitable for ensuring the formation of the graft copolymer. There is generally formed a small proportion of ungrafted diene copolymer which, if necessary, can be eliminated by dissolution in a suitable solvent; most frequently, however, this separation is unnecessary.

It is to be noted that use has already been made of an addition of a complexing agent during the ordinary polymerization or copolymerization of dienes in the presence of polymerization initiators of the redox type, formed of an organic peroxide soluble in the monomers and of a reducing agent of the polyhydroxyketone and polyhydroxyaldehyde type, such, for example, as the system cumene peroxide and glucose. However, the graft polymerization process of the present invention the case is fundamentally different, since, inter alia, no extra catalyst is added to the trunk polymer emulsion. On the one hand, the catalyst used for the trunk formation would be unable by itself to attain polymerization of the diene monomer; and on the other hand, the catalyst is furthermore substantially consumed or destroyed during the formation of the trunk polymer.

Moreover, the process of this invention does not involve the formation of active centers in the chain of the trunk polymer by the aid of the catalyst used for the polymerization, since the simple addition of a diene monomer to the trunk polymer does not result in polymerization, copolymerization or grafting of the diene monomer.

The unobviousness and unexpectedness of applicants' process is also derived from the following considerations:

(1) A catalyst of the persulphate type, either alone or added to a bisulphite, in aqueous solution becomes apt to initiate polymerization of a diene monomer, or the copolymerization of the latter with an ethylenic monomer, provided a complexing agent of heavy metals is added to the solution, for example, in the proportion of about 1% by weight with respect to the monomers. However, the rate of polymerization is very slow.

(2) If a diene monomer is added, either alone or in a mixture with an ethylenic monomer, to a latex of vinyl-type polymer or copolymer, prepared in an aqueous solution containing an emulsifying agent and a catalyst of the persulphate type, whether bisulfite is added or not, practically no reaction occurs.

(3) The mere addition, to the non-reactive mixture described in (2) of a complexing agent of heavy metals in proportion of about 1% by weight with respect to the monomer, provokes a rapid graft polymerization reaction of monomers on the polymer trunk. In other words, there is an entirely unexpected cooperative action between the latex of the vinyl polymer and the complexing agent.

It will thus be appreciated that the process of this invention results in a relatively rapid graft polymerization of the diene monomer, alone or mixed with one or more ethylenic monomers, onto a freshly prepared latex of vinyl monomer, without the addition of fresh peroxide or additives which are harmful to the final properties of the graft copolymers.

According to the novel process of this invention, there is first prepared a latex of the trunk polymer or copolymer by polymerizing one or more vinyl monomers in an emulsion in the presence of a water-soluble inorganic peroxidic initiator. When the polymerization reaction is substantially complete, any non-reacted residual monomer is separated from the emulsion. The latex is then cooled to room temperature and the complexing agent is added to said latex. The monomer or monomers to be grafted are then added. The reaction mixture is brought up to a temperature suitable for grafting, generally 10–90° C., and the formation of the graft polymer commences spontaneously. In general, the reaction is continued for from 5–20 hours.

The complexing agent can be added to the aqueous phase before the trunk polymer latex is formed, or after the formation of this latex, preferably before introducing the monomer or monomers intended for forming the graft copolymer. If the complexing agent is added after the latex is formed, it is preferably immediately after the formation of the latex. With respect to the addition of the monomers, it is preferable to add them immediately after the mixture of latex and complexing agent is obtained.

As the trunk polymer in the form of a latex, there can be employed another vinyl-type polymer or copolymer. It is appreciated that this includes a great number of polymers, but in view of the fact that these polymers are obtained by emulsion addition and polymerization, it is apparent that this particular group of polymers is operable in this invention. As examples of polymers which can be employed, reference is directed to "Vinyl and Related Polymers," Schildknecht, John Wiley & Sons, Inc., New York, 1952. Some preferred polymers and copolymers are derived from the following monomers: vinyl chloride, vinyl ester, vinylidene chloride, methacrylic and acrylic esters, acrylonitrile, vinyl pyridine, styrene. Instead of "vinyl-type polymer," the trunk polymer can be alternately defined as a polymer of a vinylidene monomer, wherein the vinyl monomer $CH_2=CHX$ is a specie thereof.

As the emulsifying agent for the polymerization of the latex, a wide variety can be employed. It is preferred that these emulsifying agents contain hydrocarbon groups of 5–22 carbon atoms coupled to highly polar solubilizing groups, such as alkali metal and ammonium carboxylate groups, sulfate half-ester groups, sulfonate groups, phosphate partial ester groups and the like. Exemplary emulsifying agents include sodium oleate, sodium stearate, sodium caproate, the sodium salts of the sulfate half-esters of fatty alcohols produced by the reduction of the fatty acids of natural oils such as coconut oil, sodium abietate, sodium salts of sulfosuccinic esters such as sodium dioctyl sulfosuccinate, sodium salts of alkylated benzene and naphthalene sulfonic acids such as sodium dodecyl naphthalene sulfonate, sodium sulfonate of benzene alkylated wtih polyisopropylene, sodium salts of sulfated fatty monoglycerides, and the like.

The temperature for conducting the polymerization of the latex is from 0 to 100° C., preferably from 30 to 80° C.

As the complexing agents which are operable in this invention, again, there is a wide variety, and to attempt to compile a comprehensive catalogue of such agents would be misleading as the important property of these complexing agents resides in the fact that these agents are capable of complexing heavy metals. For numerous examples of such agents, reference is directed to "The Sequestration of Metals," Robert L. Smith, The Macmillan Company, New York, 1959; and "Chemistry of the Metal Chelate Compounds," Arthur E. Hartoll and Melvin Calvin, Prentice-Hall, Inc., New Jersey, 1952.

Among the complexing agents which are especially suitable for use in the process of the invention there may be mentioned, for example, alkali metal and alkaline earth metal pyrophosphates, citrates and tartrates and the alkali metal and alkaline earth metal salts of ethylenediamine tetraacetic acid. The proportions of complexing agent used is advantageously from about 0.00001 to 5% by weight with respect to the mixture of diene and ethylenic monomers, the preferred proportion being generally from about 0.00001% to 0.0002%, particularly when the complexing agent is an alkali metal salt of an acid selected from the group consisting of nitriloacetic acid, ethylene diamine hydroxyethyltriacetic acid, and 2-hydroxyethyliminodiacetic acid. The satisfactory results achieved with such minute amounts of chelating agent was indeed surprising.

Among the diolefines which can be used as grafting monomers, an important class is constituted by substances having a conjugated diene structure which impart properties of high elasticity to the final product, for example, isoprene, dimethyl-2,3-butadienes, cyanobutadiene, chloro- and multi-chlorobutadienes, fluorobutadienes, butadiene, and mixtures thereof. An example of a mixture is isoprene and butadiene.

These aforementioned diene monomers can be employed by themselves or they can be employed with ethylenic monomers which are copolymerizable therewith. With respect to the permissible content of the copolymerizable ethylenic monomer, based on 100 parts by weight of the diene monomers, there can be employed about up to 1000 parts by weight, preferably 50 to 300 parts by weight of the ethylenic monomer.

By way of example of the ethylenic monomers which are suitable for the invention there can be mentioned: alpha-olefine hydrocarbons.

The vinyl derivatives: alkyl or aryl vinyl ether, alkyl or aryl vinyl ketone, styrene and its halogen-, alkyl-, alkoxy- and cyano-substituted derivatives, vinyl naphthalene and its derivatives, vinyl esters, vinyl halides, vinyl amines and their derivatives, vinyl amides and their derivatives, acrylonitrile and its derivatives, vinyl furan and its derivatives, vinyl thiophene and its derivatives.

The vinylidene monomers: 1:1 - dichloroethylene, 1-bromo-1-chloroethylene.

The divinyl monomers: divinylbenzene, divinyl ether, divinyl sulphide.

The acrylic monomers: acrylic acid and its alkylated esters, chloroacrylic esters, diethylene glycol acrylate, allyl acrylate.

The methacrylic monomers: methacrylic acid, and its alkylated esters, thiomethacrylate, cyanomethacrylate, allyl methacrylate, ethylene dimethacrylate or polyethylene glycol methacrylamide.

The allyl derivatives: allyl phthalate, allyl cyanurate.

The maleic and fumaric esters and their halogenated derivatives.

The ratio of the monomers which are grafted onto the vinyl polymer is based on 100 parts vinyl-type polymer, about 20 to 150 parts monomer, preferably 40 to 100 parts.

The foregoing description of the process of this invention is adequate to teach one skilled in the art how to practice same. As preferred specific embodiments of this invention, the following examples are presented, which examples are not intended to be in any way whatsoever limitative of the specification or appended claims.

EXAMPLE 1

Into a 5-liter autoclave of stainless steel provided with a stirrer, the following were placed:

3 liters of distilled water,
11.2 grams of stearic acid,
0.5 gram of NaOH,
0.5 gram of potassium persulphate,
0.225 gram of sodium metabisulphite.

After the oxygen had been removed by repeated purges with nitrogen, 850 grams of monomeric vinyl chloride were introduced and the temperature was brought to 60° C.

When 90% of the vinyl chloride had been polymerized, the remaining monomer was vented by reducing the pressure and purging with nitrogen.

After cooling the polymer in the autoclave to 20° C. there was introduced a degasified solution of 3.4 grams of sodium pyrophosphate decahydrate, and then a mixture of 170 grams of butadiene and 170 grams of methyl methacrylate. The temperature was brought to 40° C. and the rate of conversion of the butadiene/methyl methacrylate mixture of from 10 to 15% per hour was observed.

The polymer prepared in this example was recovered by extraction with dichloroethane and then precipitated with methyl alcohol. About 30% by weight of the recovered polymer is non-grafted polyvinylchloride and polymer without chloride, whereas 70% is the grafted polymer.

Moreover, when this example was repeated without adding pyrophosphate, no transformation of the mixture of the monomers butadiene and methyl methacrylate was observed.

EXAMPLE 2

In the apparatus described in the preceding example, there were placed:

3 liters of distilled water,
11.2 grams of stearic acid,
0.5 gram of NaOH,
0.5 gram of potassium persulphate,
0.225 gram of sodium metabisulphite,
6 grams of potassium pyrophosphate decahydrate, acting as complexing agent.

After all traces of oxygen were removed from the above solution by repeated purges with nitrogen, a mixture of 170 grams of butadiene and 170 grams of methyl methacrylate was then introduced into the apparatus. When the apparatus had been brought to 40° C., a copolymerization of the two monomers at a conversion rate of the order of only 3% per hour was observed. A comparison between this example and Example 1 shows that the trunk polymer participates in the reaction considerably accelerates the rate of reaction about 3–5 fold.

A test repeated under the same conditions, but without introducing potassium pyrophosphate showed that no polymerization occurred, even after heating for twenty hours at 40° C.

EXAMPLE 3

A latex of polyvinyl chloride was prepared in a 5-liter stainless steel autocclave, as indicated in Example 1.

After degasification of the unconverted vinyl chloride, purging with nitrogen and cooling of the autoclave, 2 grams of ethylene diamine tetraacetic acid were introduced and the pH was brought to 9 by adding caustic soda. 340 grams of butadiene and 340 grams of acrylonitrile were then added and the polymerization was thereafter carried out at 50° C. After ten hours, the grafting was complete. The proportion of grafted polymer is about 90% by weight.

EXAMPLE 4

Into a stainless steel autoclave, there were introduced:

5 liters of deionized water,
11.2 grams of stearic acid,
0.8 gram of NaOH,
0.5 gram of potassium persulphate,
0.225 gram of sodium metabisulphite.

After degasification under nitrogen, a mixture of 340 grams of vinyl acetate and 510 grams of vinyl chloride was added and the copolymerization was carried out at 60° C. After polymerization, the remaining monomers were carefully removed by degasification and entrainment with nitrogen. The autoclave was then cooled to 20° C.

A degasified solution containing 4 grams of sodium citrate and a mixture of 170 grams of butadiene and 170 grams of freshly distilled ethyl acrylate were then introduced. At 40° C., the graft copolymerization reaction took place spontaneously. In 20 hours, the conversion rate was about 80%. The proportion of grafted polymer is about 90% by weight.

EXAMPLE 5

Into a stainless steel autoclave having a capacity of 5 liters there were introduced:

3 liters of deionized and deaerated water,
8 grams of laurylsodiumsulphate,
0.5 gram of sodium persulphate,
0.25 gram of sodium metabisulphite,
800 grams of methyl methacrylate washed with a soda solution of 10% strength and deaerated.

The temperature was then brought to 60° C. The polymerization was very rapid and the autoclave had to be cooled by circulated cold water through the double jacket. This release of heat enabled the course of the polymerization to be followed. When the latter was completed, the temperature was lowered to 20° C. A solution of 2.2 grams of the sodium salt of ethylene diamine tetraacetic acid was added and the pH was adjusted to 9.5 by adding soda. A mixture of 170 grams of butadiene and 170 grams of methyl methacrylate was introduced. The reaction was continued at 40° C. The mixture of monomers was polymerized at a mean conversion rate of about 25% per hour.

There is in the polymer neither polymethyl methacrylate, nor a copolymer of methyl methcrylate and butadiene. The grafting is substantially 100% efficient.

EXAMPLE 6

In the same apparatus as described in the preceding example, a polystyrene latex was prepared by introducing:

3 liters of deaerated distilled water,
8 grams of lauryl sodium sulphate,
4 grams of potassium persulphate,
800 grams of styrene monomer freshly distilled under a current of argon.

The polymerization was carried out at 60° C. When it was practically complete, the unconverted styrene was removed by distillation under vacuum; the temperature was then lowered to 20° C. and a solution of 2 grams of sodium salt of nitriloacetic acid were introduced. The pH was then adjusted to 9.5 by adding soda.

170 grams of butadiene and 170 grams of methyl methacrylate were then introduced into the autoclave, the temperature of which was brought to 50° C. The conversion rate was then 15% per hour. The proportion of grafted polymer is about 95% by weight.

EXAMPLE 7

A latex of polyvinyl chloride was prepared as indicated in Example 1. After cooling to 20° C., a deaerated solution of 3.4 grams of decahydrated sodium pyrophosphate was introduced and then a mixture of 340 grams of butadiene and 170 grams of freshly distilled monomeric acrylonitrile. The temperature was brought to 40° C. The polymerization took place at a conversion rate of about 10% per hour. The proportion of grafted polymer is about 90% by weight.

EXAMPLE 8

Into a 5-liter stainless steel autoclave there were introduced:

3 liters of distilled water,
8 grams of lauryl sodium sulphate,
4 grams of potassium persulphate,
2 grams of sodium metabisulphite,
425 grams of freshly distilled vinylidene chloride,
425 grams of vinyl chloride.

The polymerization was carried out at 60° C.
When the pressure in the autoclave reached a value of 3 kg., the monomer was purged by a current of pure nitrogen and the latex was cooled to 20° C.

A solution of 2 grams of sodium salt of ethylenediamine tetracetic acid in 50 cc. of deionized and deaerated water was then introduced into the autoclave. The pH was adjusted to 9.5. By excess pressure of nitrogen, a mixture of 510 grams of butadiene and 170 grams of freshly distilled vinyl pyridine was made to flow into the autoclave. The grafting reaction took place at 50° C. The proportion of grafted polymer is about 85% by weight.

EXAMPLE 9

Into a 5-liter stainless steel autoclave, there were introduced:

3 liters of distilled water,
17 grams of lauryl sodium sulphate,
0.5 gram of potassium persulphate,
0.225 gram of potassium metabisulphite,
500 grams of ethyl acrylate freshly distilled.

After the polymerization was completed at 60° C. there were introduced into the autoclave:

3.4 grams of sodium pyrophosphate,
170 grams of butadiene,
170 grams of methylmethacrylate.

After the reaction was conducted for 14 hours at 40° C., the conversion of monomers reached about 90%.

The latex was precipitated, washed and dried. The polymer was completely soluble in acetone and in tetrahydrofuran. About 4% by weight was soluble in methyl alcohol. The proportion of grafted polymer is 96% by weight.

EXAMPLE 10

The following tests show the important role played by the complexing agent in the grafting reaction of mixture of butadiene and acrylonitrile.

A latex of polyvinyl chloride is prepared according to the same technique as described in Example 1.

In a first experiment a mixture of 680 grams of butadiene and 170 grams of acrylonitrile is added to this latex. The temperature is brought to 40° C. whereby reaction takes place. However, this reaction is extremely slow.

Conversion rate is about 2% per hour at the start. After 16 hours conversion ratio of reaction is only about 27%.

In a second experiment 4 grams of sodium pyrophosphate are added to said latex followed by a mixture of 680 grams of butadiene and 170 grams of acrylonitrile.

The temperature is brought to 40° C. The polymerization rate is about 11% per hour. The conversion ratio, after 15 hours, is about 88%.

If these same two experiments are carried out at 60° C. instead of 40° C., the ratios conversion are respectively about 90%, after 25 hours, and about 90% after 4 hours.

EXAMPLE 11

The following tests show the important role played by the trunk polymer in the kinetics of the grafting reaction.

Four polyvinyl chloride lattices containing respectively 75, 200, 380 and 1200 grams of polymer are prepared according to the method outlined in Example 1. After removal of residual monomer an agueous degasified solution of 0.1 gram of ethylene diamine tetracetic acid is added to each latex followed by a mixture of 170 grams of butadiene and 170 grams of methyl methacrylate. The temperature is brought to 40° C.

In the table hereunder the grafting reaction rate is given for each of the four lattices

| Weight of PVC grams: | Rate by hour, percent |
|---|---|
| 75 | 5 |
| 200 | 13 |
| 380 | 14.5 |
| 1200 | 19 |

EXAMPLE 12

A latex of polyvinyl chloride was prepared in a 5 liter stainless steel autoclave as indicated in Example 1.

After degasification of the unconverted vinyl chloride, purging with nitrogen and cooling of the autoclave 6 grams of sodium pyrophosphate were introduced and the pH brought to 10 by adding sodium hydroxide. 680 grams of butadiene were then added and the polymerization was thereafter carried out at 80° C. After 5 hours the reaction is achieved giving a high grafting ratio graft copolymer.

EXAMPLE 13

In an autoclave made of stainless steel, provided with an agitator, is introduced:

3 liters of deionized water
11.2 g. of stearic acid
0.5 g. of sodium hydroxide
0.45 g. of potassium persulphate
0.225 g. of sodium metabisulfite After eliminating the oxygen by means of repeated nitrogen purges, 850 g. of vinyl chloride monomer are introduced and the temperature is brought to 60° C. When 90% of vinyl chloride are polymerized, the monomer left is evacuated by pressure release and then passing nitrogen. After cooling at 20° C., a degased solution of 0.004 g. of ethylene diamine sodium tetraacetate is introduced, then a mixture of 170 g. of freshly distilled butadiene and 170 g. of methyl methacrylate previously washed with a 2% by weight sodium hydroxide solution.

The temperature in the autoclave is brought up to 40° C. A conversion rate of the grafting reaction of the order of 15% per hour is noted.

EXAMPLE 14

In the autoclave described in the preceding example, a latex of polyvinyl chloride is prepared under the same conditions as the one described in Example 13.

After the polymerization of the vinyl chloride and cooling at the ordinary temperature, an aqueous solution of 0.001 g. of tetracetate ethylene diamine sodium is added, then a mixture of 680 g. of butadiene and 170 g. of acrylonitrile freshly distilled. The temperature in the autoclave is brought up at 60° C. and a conversion rate of the grafting reaction of the order of 30% per hour is obtained. This rate does not increase if additional quantities of the complexing agent are added.

The preceding examples can be repeated with the various vinyl-type polymers, dienes, ethylenic monomers and complexing agents which are mentioned in the discussion of the invention preceding the examples with similar results being obtained.

Without further analysis, it is believed that from the aforementioned description of the invention, one skilled in the art can ascertain the essential characteristics thereof. It is also to be understood that one skilled in the art can, utilizing these essential characteristics, modify and adapt this invention to various usages and conditions and, accordingly, it is desired to comprehend such modifications as being equivalent to, and falling within the scope of the appended claims.

What is claimed is:

1. In a process of grafting a monomer selected from the group consisting of a diene monomer and a mixture of a diene monomer with an ethylenically unsaturated copolymerizable monomer onto a preformed vinyl polymer dispersed in aqueous medium to form a latex, the improvement which consists of adding only a water soluble complexing compound in the form of a chelating agent selected from the group consisting of an alkali metal salt and an alkaline earth metal salt of ethylenediaminetetraacetic acid, nitriloacetic acid, ethylenediaminehydroxyethyltriacetic acid and 2-hydroxy-ethylimino-diacetic acid, an alkali metal pyrophosphate, an alkaline earth metal pyrophosphate, an alkali metal citrate, an alkaline earth metal citrate, an alkali metal tartrate and an alkaline earth metal tartrate, said water soluble salt being added to the preformed vinyl polymer latex after polymer formation but on or before addition of the monomer in an amount within the range of 0.00001 to 5 percent by weight of said monomer, whereby the conversion rate for the grafting reaction is greatly increased.

2. The process as claimed in claim 1 in which the materials are reacted in the proportions of 10 parts by weight of the diene monomer and up to 100 parts by weight of the ethylenically unsaturated copolymerizable monomer to 6 to 500 parts by weight of the vinyl prepolymer.

3. The process of claim 1, wherein the amount of chelating agent is 0.00001 to 0.0002%.

4. The process of claim 1, wherein the diene monomer is selected from the group consisting of isoprene, dimethyl-2,3-butadiene, cyanobutadiene, chlorobutadiene, fluorobutadiene, butadiene, and mixtures thereof.

References Cited

UNITED STATES PATENTS

| | | | |
|---|---|---|---|
| 2,877,200 | 3/1959 | Carpenter | 260—879 |
| 3,327,022 | 6/1967 | Riou et al. | 260—879 |
| 2,996,469 | 8/1961 | Cole et al. | 260—29.7 |
| 3,222,423 | 12/1965 | Roebuck | 260—880 |
| 3,231,410 | 1/1966 | Huber et al. | 260—879 |

FOREIGN PATENTS

| | | |
|---|---|---|
| 819,651 | 9/1959 | Great Britain. |
| 873,948 | 8/1961 | Great Britain. |

OTHER REFERENCES

Bovey et al., Emulsion Polymerization Interscience Publishers, Inc., New York, 1955, p. 395.

SAMUEL H. BLECH, Primary Examiner

J. SECCURO, Assistant Examiner

U.S. Cl. X.R.

260—877, 878, 879